F. M. BEYDLER.
SPRING WHEEL.
APPLICATION FILED JUNE 24, 1911.
1,035,410.
Patented Aug. 13, 1912.
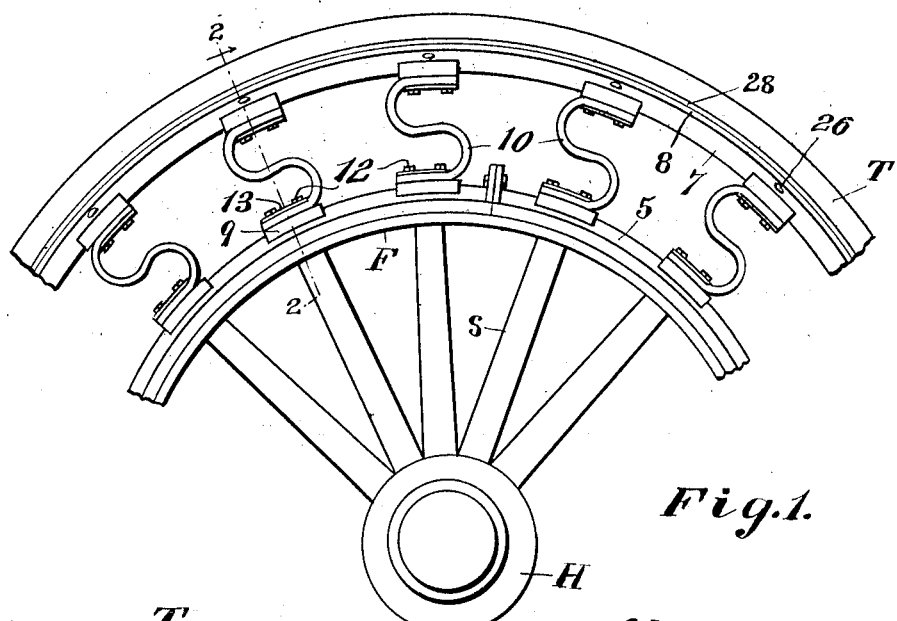
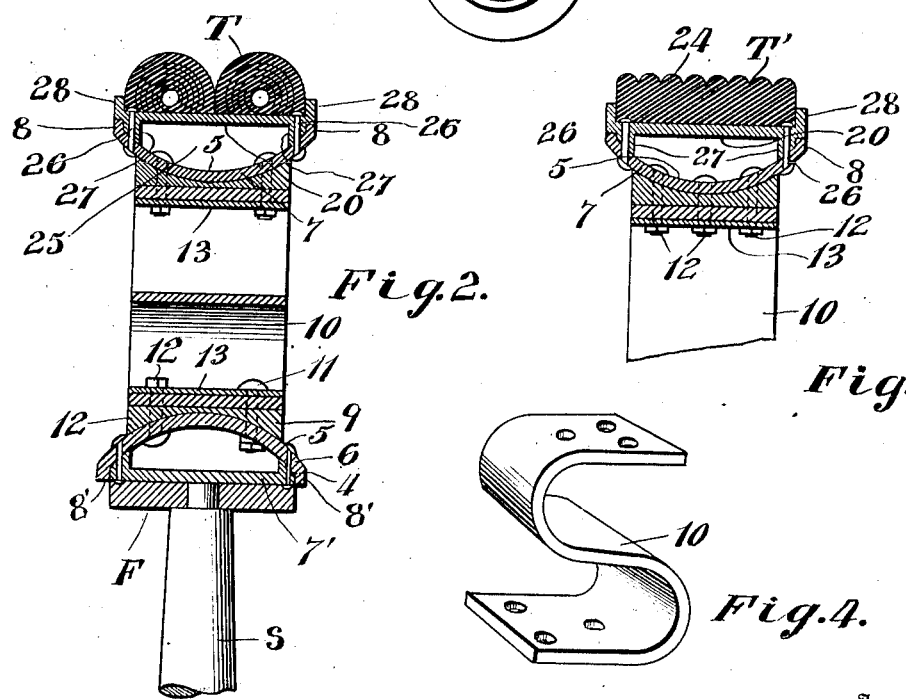
Witnesses
Thos. F. Knox,
D. W. Gould
Inventor
Frank M. Beydler
By Victor J. Evans
Attorney

UNITED STATES PATENT OFFICE.

FRANK M. BEYDLER, OF ASHLAND, KANSAS.

SPRING-WHEEL.

1,035,410.  Specification of Letters Patent.  Patented Aug. 13, 1912.

Application filed June 24, 1911. Serial No. 635,054.

*To all whom it may concern:*

Be it known that I, FRANK M. BEYDLER, a citizen of the United States, residing at Ashland, in the county of Clark and State of Kansas, have invented new and useful Improvements in Spring-Wheels, of which the following is a specification.

This invention is a spring wheel, and the object of the same is to produce such a wheel for use on automobiles and in other places where side thrusts must be avoided and to construct the same in such a manner that it will be adapted to either pneumatic or cushion tires.

This object I accomplish by the construction hereinafter more fully described and claimed, and as shown in the drawings wherein,—

Figure 1 is a side elevation of a portion of this wheel with some of the springs in place. Fig. 2 is an enlarged cross section through one side of the same on the line 2—2 of Fig. 1. Fig. 3 is a sectional detail showing another form of tire. Fig. 4 is a perspective detail of one of the springs.

In the drawings the letter H designates the hub, S the spokes, F the felly, and T the tire of a wheel, these parts being of the usual or of any approved construction and forming no part of the present invention. It is my purpose to employ with such a wheel a peculiar shape of springs between the felly and the rim whereon the tire is mounted, and in order to carry out the idea I modify or amplify the details of construction of these parts as will now be described. The felly F is by preference curved on its outer face as seen at 5, and over the same lies a facing strip 6 which is by preference a channeled steel band curved to conform with the felly. The inner rim 7' is by preference a channeled steel band curved in cross section and provided with flanges 8 along its edges which bear on shoulders 4. The outer rim 7 is spaced from the inner rim, the space being provided for the reception of the springs best seen in Fig. 4, and their curved adjacent faces serving to deflect outward the mud and dust which might otherwise accumulate therein. At various points around the wheel there are disposed upon said curved faces malleable blocks 9 whose outer faces are curved to conform with the curved faces of the strips and whose inner faces are flat, and between these blocks are located S-shaped springs 10 whose extremities are bolted to the flat faces of the blocks as at 11 and 12, there being by preference two of the bolts 11 to each inner end of the spring passing through the block, the strip, and the felly; and three of the bolts 12 through the outer end of the spring passing through the block and the rim at that point. In Fig. 2 I have shown plates 13 which take the place of washers, standing inside the extremities of the springs and under the heads of the bolts whose nuts are therefore at the opposite ends of the latter, and at the right side of the top of this view I have shown one bolt 11' inverted so that its head stands within the felly F and its nut inside the washer plate 13, therefore illustrating the fact that it might be possible to reverse the position of the bolts. Obviously the washer plates could be omitted entirely if desired, although I consider their use preferable because they strengthen the structure. I prefer to make these springs each of one-sixteenth inch thickness, about three inches in width, and of such length as is necessary to give them the desired curvature so as to occupy the space between any two oppositely disposed blocks 9, although of course these dimensions are susceptible of considerable change without departing from the spirit of my invention.

The tire bed 20 is shown in Fig. 2 as a flat plate or strip having flanges 28 on its edges which project radially outward and stand in alinement with the flanges 8 along the edges of rim 7, and just inside these flanges 28 are other flanges 27 projecting radially inward and which therefore stand just inside said flanges 8 so as to make a close connection therewith. Through this bed and preferably also through the flanges 27 thereof are passed radial rivets or bolts 26 by means of which the bed is detachably connected with the rim 7. If said bed is a flat plate as shown in Fig. 2, there is a space left between it and the curved or dished outer face of the rim 7, but it is quite possible to give the bed another configuration to adapt it to the shape of the tire T which is to be placed thereon. This tire in Fig. 2 is shown as made up of two cushion tires standing side by side, and each comprising about three-quarters of a circle; and in Fig. 3 I have shown a single cushion tire T' having a corrugated face 24 which will prevent slipping or skidding perhaps as well as a plurality of individual tires T. Thus it will be seen that I have produced an improved spring wheel comprising two concentric members spaced apart about seven inches more or less, and connected by springs which may occur as often as desired around the tire, according to the strength it is necessary the finished wheel must have. The size of the latter is of course immaterial and the thickness and width of the material of which the springs is composed is also dependent upon the strength that the finished wheel must have. As the latter revolves and the weight of the superstructure is thrown upon the springs at the bottom, they compress while those at the top expand, and simultaneously those at the sides of the wheel must deflect a little out of a true radial line as will be understood. This action takes place constantly during the rotation of the wheel and is noiseless and automatic, and when an obstruction such as a stone is struck the springs at the bottom compress to a greater extent and the jar of passing over the obstruction is not communicated to the superstructure.

An extremely important feature of my invention is the fact that in rounding curves or when a side thrust is thrown upon this wheel its outer member will not be deflected out of the plane of its inner member and the spokes because the springs are rather wide and are connected at several points at their extremities with both the facing strip 6 and the rim 7. Obviously the bolts 11 through the felly F must stand at either side of the tenon where the outer end of the spoke S joins said felly, but the bolts 12 which connect the outer end of the springs with the rim 7 can be three in number as shown in Fig. 2 because there is no such tenon at this point. The outer or side bolts 12 will be longer than the intermediate bolt because of the greater thickness of the block 9 at the sides of the wheel. When the latter is used, however, its flange 27 fits neatly within the flange 8 along the edge of the rim 7 as seen in Fig. 2 so that there is no possibility of lateral movement of the bed 20 with reference to the rim 7. As above stated, the exact shape and character of the tire is immaterial to this invention, as is also its manner of fastening within the tire bed 20 or within the curved side of the rim 7.

What is claimed as new is:

1. In a spring wheel, the combination with the felly; of an inner rim secured to the felly, an outer rim including a channeled portion adapted to receive a tire, and a facing strip secured to the channel portion and having a convex surface, blocks having curved faces conforming to the convex surfaces of said strip and secured to the strip, and springs connecting said blocks with said inner rim.

2. In a spring wheel, the combination with the felly, a steel rim composed of a strip dished in cross section and having outwardly projecting flanges at its edges, and springs between the felly and strip; of a tire bed having on its inner face flanges projecting inwardly and adapted to pass inside those on the rim, bolts passing through said bed, flanges and rim, and a tire secured upon the outer face of said bed.

In testimony whereof I affix my signature in presence of two witnesses.

FRANK M. BEYDLER.

Witnesses:
L. D. KIBBY,
CHAS. R. DUGAN.

---

Copies of this patent may be obtained for five cents each, by addressing the "Commissioner of Patents, Washington, D. C."